(12) United States Patent
Fukada et al.

(10) Patent No.: US 12,434,991 B2
(45) Date of Patent: Oct. 7, 2025

(54) METHOD FOR PRODUCING GLASS ARTICLE AND GLASS ARTICLE

(71) Applicant: Nippon Electric Glass Co., Ltd., Shiga (JP)

(72) Inventors: Mutsumu Fukada, Shiga (JP); Motokazu Ogata, Shiga (JP); Mina Mabuchi, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 508 days.

(21) Appl. No.: 17/775,383

(22) PCT Filed: Dec. 2, 2020

(86) PCT No.: PCT/JP2020/044833
§ 371 (c)(1),
(2) Date: May 9, 2022

(87) PCT Pub. No.: WO2021/124892
PCT Pub. Date: Jun. 24, 2021

(65) Prior Publication Data
US 2022/0388887 A1 Dec. 8, 2022

(30) Foreign Application Priority Data

Dec. 19, 2019 (JP) ................................. 2019-229404

(51) Int. Cl.
*C03B 17/06* (2006.01)
*C03C 3/097* (2006.01)
(52) U.S. Cl.
CPC ............ *C03B 17/064* (2013.01); *C03C 3/097* (2013.01)

(58) Field of Classification Search
CPC .............................. C03C 3/097; C04B 35/443
See application file for complete search history.

(56) References Cited

U.S. PATENT DOCUMENTS

| | | | | |
|---|---|---|---|---|
| 5,535,811 | A | * | 7/1996 | Feagin .................... C04B 28/00 106/38.22 |
| 2009/0131241 | A1 | * | 5/2009 | Godard ................. C04B 35/495 501/106 |

(Continued)

FOREIGN PATENT DOCUMENTS

| | | | |
|---|---|---|---|
| CN | 103153909 | 6/2013 | |
| CN | 108793734 A | * 11/2018 | ............. C03B 17/06 |

(Continued)

OTHER PUBLICATIONS

Office Action issued Dec. 14, 2023 in corresponding Chinese Patent Application No. 202080079469.2, with English-language translation.

(Continued)

*Primary Examiner* — Alison L Hindenlang
*Assistant Examiner* — Steven S Lee
(74) *Attorney, Agent, or Firm* — Wenderoth, Lind & Ponack, L.L.P.

(57) ABSTRACT

A method of manufacturing a glass article includes a forming step of causing a first molten glass (Gm1) including $P_2O_5$ to flow down along a surface of a forming trough (15) including an yttrium-containing oxide by a down-draw method to form a glass ribbon (G), wherein the forming trough (15) includes a Mg-rich layer (MR) serving as a diffusion suppression layer for suppressing diffusion of the yttrium-containing oxide on the surface thereof.

7 Claims, 6 Drawing Sheets

(56) References Cited

U.S. PATENT DOCUMENTS

| | | | |
|---|---|---|---|
| 2010/0212359 A1* | 8/2010 | Godard | C03B 17/064 65/374.13 |
| 2010/0251774 A1* | 10/2010 | Peterson | C03B 17/064 65/374.13 |
| 2012/0141701 A1* | 6/2012 | Fourcade | C04B 41/91 428/34.1 |
| 2012/0227445 A1* | 9/2012 | Citti | C03B 17/064 65/53 |
| 2012/0260696 A1* | 10/2012 | Citti | C03B 17/064 65/374.13 |
| 2013/0217563 A1* | 8/2013 | Citti | C04B 35/111 501/133 |
| 2013/0224465 A1* | 8/2013 | Langensiepen | C04B 35/447 428/220 |
| 2016/0107936 A1 | 4/2016 | Citti et al. | |
| 2017/0129218 A1* | 5/2017 | Cleary | C03C 3/091 |
| 2017/0240460 A1* | 8/2017 | Boek | B32B 7/027 |
| 2018/0044223 A1* | 2/2018 | Hayashi | C03C 3/097 |
| 2018/0148369 A1* | 5/2018 | Gross | C03C 3/097 |
| 2018/0162768 A1* | 6/2018 | Boek | C03B 17/064 |
| 2019/0062200 A1* | 2/2019 | He | C03C 3/078 |

FOREIGN PATENT DOCUMENTS

| | | | | |
|---|---|---|---|---|
| CN | 110582473 A | * | 12/2019 | ............ B32B 17/06 |
| JP | 2011-520758 | | 7/2011 | |
| JP | 2012-518591 | | 8/2012 | |
| JP | 2013-212943 | | 10/2013 | |
| JP | 2013212943 A | * | 10/2013 | ........... C03B 17/064 |
| JP | 2013-542166 | | 11/2013 | |
| JP | 2018-062433 | | 4/2018 | |
| JP | 2018-135267 | | 8/2018 | |
| WO | 2009/142695 | | 11/2009 | |
| WO | WO-2009142695 A2 | * | 11/2009 | ........... C03B 17/064 |
| WO | 2012/058194 | | 5/2012 | |
| WO | 2013/106609 | | 7/2013 | |

OTHER PUBLICATIONS

International Preliminary Report on Patentability and Written Opinion of the International Searching Authority issued May 17, 2022 in corresponding International (PCT) Patent Application No. PCT/JP2020/044833.

International Search Report issued Dec. 28, 2020 in International (PCT) Application No. PCT/JP2020/044833.

* cited by examiner

METHOD FOR PRODUCING GLASS ARTICLE AND GLASS ARTICLE

TECHNICAL FIELD

The present invention relates to a method of manufacturing a glass article and a glass article.

BACKGROUND ART

In a manufacturing process for a glass article, such as a glass sheet or a glass roll, for example, molten glass is caused to flow down along the surface of a forming trough by a down-draw method to continuously form a glass ribbon. The glass ribbon having been formed is cooled to near room temperature while being conveyed to a downstream side, and is then cut every predetermined length so as to provide a glass sheet, or taken up into a roll shape so as to provide a glass roll (see, for example, Patent Literature

CITATION LIST

Patent Literature 1: JP 2018-062433 A

SUMMARY OF INVENTION

Technical Problem

In the above-mentioned forming trough, from the viewpoint of increasing the mechanical strength thereof, an yttrium-containing oxide (e.g., $Y_3Al_5O_{12}$, which is a composite oxide of yttrium and aluminum) is added to constituent components of the forming trough in some cases.

The inventors of the present invention have repeated extensive investigations, and as a result, have found for the first time the following problem: when a glass ribbon comprising $P_2O_5$ (phosphorus oxide) is formed by using such forming trough comprising an yttrium-containing oxide, yttrium oxide ($Y_2O_3$) is eluted or the like from the yttrium-containing oxide serving as an additive to the forming trough to diffuse into molten glass, to thereby generate a devitrified product. Such devitrified product derived from the yttrium-containing oxide may cause a defect in the glass ribbon and/or a glass article, and hence it is important to reduce the generation amount thereof also from the viewpoints of improving production efficiency and quality. The devitrified product derived from the yttrium-containing oxide is conceivably generated through a reaction between yttrium oxide having diffused into the molten glass and $P_2O_5$ in the molten glass. That is, it is conceived that the devitrified product derived from the yttrium-containing oxide is a devitrified product ($Y_2O_3$—$P_2O_5$ crystal) comprising yttrium oxide and $P_2O_5$.

An object of the present invention is to reliably reduce the generation of a devitrified product derived from an yttrium-containing oxide included in a forming trough when a glass ribbon is formed by a down-draw method.

Solution to Problem

According to one embodiment of the present invention, which has been devised in order to achieve the above-mentioned object, there is provided a method of manufacturing a glass article, comprising a forming step of causing a first molten glass comprising $P_2O_5$ to flow down along a surface of a forming trough comprising an yttrium-containing oxide by a down-draw method to form a glass ribbon, wherein the forming trough comprises a diffusion suppression layer for suppressing diffusion of the yttrium-containing oxide on the surface thereof.

With this configuration, the diffusion suppression layer for suppressing diffusion of the yttrium-containing oxide is formed on the surface of the forming trough, and hence the diffusion of the yttrium-containing oxide included in the forming trough into the first molten glass can be reliably suppressed. As a result, a reaction between the yttrium-containing oxide included in the forming trough and $P_2O_5$ included in the first molten glass is less liable to occur, with the result that the generation of a devitrified product derived from the yttrium-containing oxide can be reliably reduced.

In the above-mentioned configuration, it is preferred that the diffusion suppression layer be a Mg-rich layer comprising magnesium.

With this configuration, the diffusion of the yttrium-containing oxide included in the forming trough into the first molten glass can be suppressed more reliably.

In the above-mentioned configuration, when the diffusion suppression layer is the Mg-rich layer, it is preferred that the forming trough be an alumina-based forming trough, and the Mg-rich layer comprise spinel as a main component.

With this configuration, the alumina-based forming trough comprises alumina, and hence the Mg-rich layer comprising spinel as a main component is easily formed on the surface of the forming trough through a reaction between alumina and MgO.

In the above-mentioned configuration, when the diffusion suppression layer is the Mg-rich layer, it is preferred that the first molten glass have a content of MgO of from 0.3 mass % to 5.5 mass %. Specifically, it is preferred that the first molten glass comprise as a glass composition, in terms of mass %, 40% to 80% of $SiO_2$, 5% to 30% of $Al_2O_3$, 0% to 15% of $B_2O_3$, 1% to 25% of $Na_2O$, 0% to 10% of $K_2O$, 0.3% to 5.5% of MgO, 0.5% to 10% of $P_2O_5$, and 0% to 10% of $Li_2O$.

With this configuration, the first molten glass comprises MgO to some extent, and hence the diffusion of a magnesium ion from the Mg-rich layer into the first molten glass can be suppressed. That is, the Mg-rich layer can be stably maintained on the surface of the forming trough. In addition, the first molten glass comprises $P_2O_5$, and a devitrified product derived from the yttrium-containing oxide is liable to be generated, and hence an effect of reliably reducing the generation of the devitrified product derived from the yttrium-containing oxide according to the present invention becomes remarkable.

In the above-mentioned configuration, when the diffusion suppression layer is the Mg-rich layer, it is preferred that the first molten glass have a content of MgO of 0 mass % or more and less than 0.3 mass %. Specifically, it is preferred that the first molten glass comprise as a glass composition, in terms of mass %, 40% to 80% of $SiO_2$, 5% to 30% of $Al_2O_3$, 0% to 15% of $B_2O_3$, 1% to 25% of $Na_2O$, 0% to 10% of $K_2O$, 0% or more and less than 0.3% of MgO, 0.5% to 10% of $P_2O_5$, and 0% to 10% of $Li_2O$.

In the case where the first molten glass is free of MgO or has a small content of MgO as described above, when the diffusion suppression layer is formed of the Mg-rich layer, a magnesium ion included in the Mg-rich layer diffuses into the first molten glass. That is, a portion of the first molten glass having been brought into contact with the Mg-rich layer of the forming trough is increased in content of MgO, with the result that a MgO-rich layer can be formed at a position of a joined surface of a glass article to be obtained. MgO is a component that increases mechanical strength, and hence the MgO-rich layer present at the position of the joined surface of the glass article acts as a core material, with the result that warpage or deflection of the glass article can be reduced. In addition, the thermal expansion coefficient of the MgO-rich layer is increased with an increase in content of MgO, and hence a compressive stress is generated in a surface layer of the glass ribbon in the course of cooling the glass ribbon having been formed. Accordingly, the glass article is suitable as glass to be chemically tempered.

In the above-mentioned configuration, when the diffusion suppression layer is the Mg-rich layer, it is preferred that the method further comprise, as a preliminary step to the forming step, a formation step of causing a second molten glass comprising MgO to flow down along the surface of the forming trough to form the Mg-rich layer on the surface of the forming trough.

With this configuration, the Mg-rich layer can be sufficiently formed on the surface of the forming trough.

In the above-mentioned configuration, the diffusion suppression layer may be an alumina layer.

With this configuration, the diffusion of the yttrium-containing oxide included in the forming trough into the molten glass can be suppressed more reliably.

In the above-mentioned configuration, when the diffusion suppression layer is the alumina layer, it is preferred that the first molten glass have a content of MgO of 0 mass % or more and less than 0.3 mass %.

That is, in the case where the first molten glass is free of MgO or has a small content of MgO, when the diffusion suppression layer is formed of the Mg-rich layer, a magnesium ion included in the Mg-rich layer diffuses into the first molten glass, and there is a risk in that the Mg-rich layer may be reduced, eliminated, or altered. Accordingly, it may become difficult to suppress the diffusion of the yttrium-containing oxide included in the forming trough into the first molten glass over a long period of time. As a countermeasure for this, when the diffusion suppression layer is formed of the alumina layer, the above-mentioned problem can be avoided.

In the above-mentioned configuration, when the diffusion suppression layer is the alumina layer, it is preferred that the first molten glass comprise as a glass composition, in terms of mass o, 40% to 80% of $SiO_2$, 5% to 30% of $Al_2O_3$, 0% to 15% of $B_2O_3$, 1% to 25% of $Na_2O$, 0% to 10% of $K_2O$, 0% or more and less than 0.3% of MgO, 0.5% to 10% of $P_2O_5$, and 0% to 10% of $Li_2O$.

In the above-mentioned configuration, when the diffusion suppression layer is the alumina layer, it is preferred that the forming trough be an alumina-based forming trough.

With this configuration, the alumina-based forming trough comprises alumina, and hence the alumina layer is easily formed on the surface of the forming trough.

In the above-mentioned configuration, when the diffusion suppression layer is the alumina layer, it is preferred that the method further comprise, as a preliminary step to the forming step, a formation step of forming the alumina layer on the surface of the forming trough, wherein the formation step comprises: a first step of causing a second molten glass comprising MgO to flow down along the surface of the forming trough to form a Mg-rich layer comprising spinel as a main component on the surface of the forming trough; and a second step of causing a third molten glass substantially free of MgO to flow down along the surface of the forming trough on which the Mg-rich layer has been formed to form the alumina layer from the Mg-rich layer.

With this configuration, the alumina layer can be sufficiently formed on the surface of the forming trough.

When the formation step for the alumina layer is included, it is preferred that a temperature of at least one of the second molten glass or the third molten glass in the formation step be higher than a temperature of the first molten glass in the forming step.

With this configuration, yttrium oxide is easily eluted from the yttrium-containing oxide in a surface layer portion of the forming trough into the molten glass at the stage of the formation step, and the concentration of the yttrium-containing oxide in the surface layer portion of the forming trough can be reduced. As a result, the amount of the yttrium-containing oxide in the Mg-rich layer is reduced, and the alumina layer having a high concentration of alumina is easily formed from the Mg-rich layer.

According to one embodiment of the present invention, which has been devised in order to achieve the above-mentioned object, there is provided a glass article, which is formed by a down-draw method and has a joined surface in an inside thereof, wherein the glass article comprises a MgO-rich layer having a rich content of MgO at a position of the joined surface.

MgO is a component that increases mechanical strength, and hence the MgO-rich layer present at the position of the joined surface of the glass article acts as a core material, with the result that warpage or deflection of the glass article can be reduced. In addition, the thermal expansion coefficient of the MgO-rich layer is increased, and hence a compressive stress is generated in a surface layer of the glass ribbon in the course of cooling the glass ribbon having been formed by a down-draw method. Accordingly, the surface layer of the glass article becomes a compressive stress layer, and hence the glass article is suitable as glass to be chemically tempered.

In the above-mentioned configuration, it is preferred that the glass article be formed of aluminosilicate glass comprising as a glass composition, in terms of mass %, 40% to 80% of $SiO_2$, 5% to 30% of $Al_2O_3$, 0% to 15% of $B_2O_3$, 1% to 25% of $Na_2O$, 0% to 10% of $K_2O$, 0% or more and less than 0.3% of MgO, 0.5% to 10% of $P_2O_5$, and 0% to 10% of $Li_2O$, and a ratio (R1/R2) of a content R1 of MgO in the MgO-rich layer to a content R2 of MgO in an intermediate layer between a surface layer of the glass article and the MgO-rich layer be from 102.5% to 115%.

When the ranges of the glass composition are restricted as described above, both ion exchange performance and devitrification resistance are easily achieved at high levels. In addition, the content of MgO is 0% or more and less than 0.3%, and hence a magnesium ion included in the Mg-rich layer of the forming trough easily diffuses into the molten glass, and the MgO-rich layer formed at the position of the joined surface is increased in content of MgO. Accordingly, a ratio (R1/R2) of the content R1 of MgO in the MgO-rich layer to the content R2 of MgO in the intermediate layer in the glass article can be set to from 102.5% to 115%, and the mechanical strength of the MgO-rich layer is further increased. As a result, warpage or deflection of the glass article can be further reduced.

Advantageous Effects of Invention

According to the present invention, the generation of a devitrified product derived from an yttrium-containing oxide included in a forming trough when a glass ribbon is formed by a down-draw method can be reliably reduced.

DESCRIPTION OF EMBODIMENTS

Now, embodiments of the present invention are described with reference to the attached drawings. In the figures, the X direction represents a horizontal direction, and the Z direction represents a perpendicular direction. Overlapping description may be omitted by denoting corresponding constituent elements in the embodiments by the same reference symbols. When only part of a configuration is described in each of the embodiments, a configuration in other embodiments that has already been described may be adopted for other parts of the configuration. In addition, configurations may be combined in a combination explicit in the description of each of the embodiments, and not only that, part of configurations of a plurality of the embodiments may be combined in an even implicit combination as long as the combination has no particular disadvantage.

First Embodiment

Figure 1:
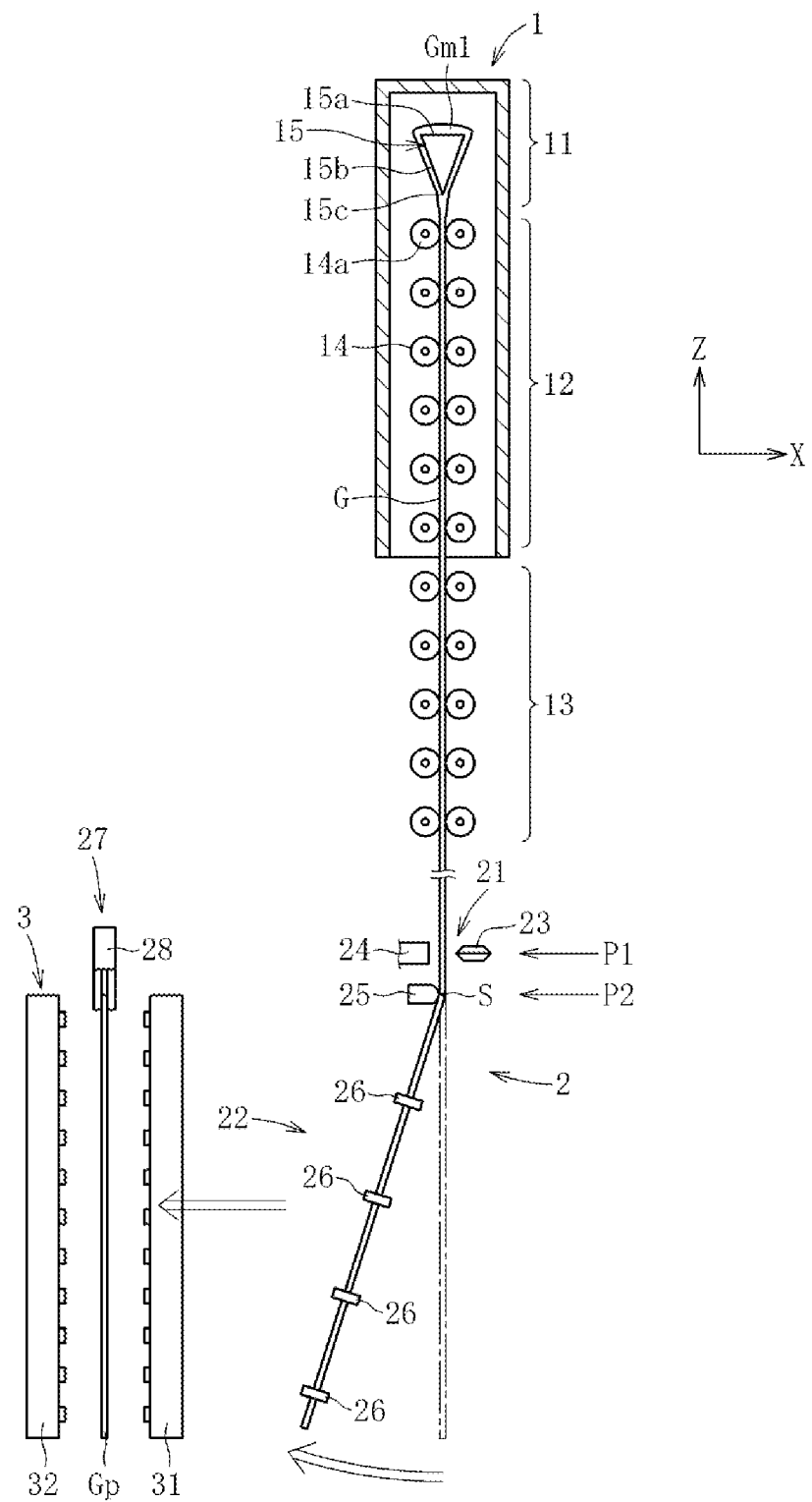
FIG. 1 is a vertical sectional view of a manufacturing apparatus for a glass article according to a first embodiment of the present invention.

As illustrated in FIG. 1, a manufacturing apparatus for a glass article according to a first embodiment is an apparatus for manufacturing a glass sheet Gp serving as a glass article. This manufacturing apparatus comprises: a treatment device 1 for a glass ribbon G; a cutting device 2; and an inspection device 3.

The treatment device 1 comprises a forming zone 11 for continuously forming the glass ribbon G, a heat treatment zone 12 for subjecting the glass ribbon G to heat treatment (annealing), a cooling zone 13 for cooling the glass ribbon G to near room temperature, and roller pairs 14 arranged in each of the forming zone 11, the heat treatment zone 12, and the cooling zone 13 in a plurality of states in an up-and-down direction.

The forming zone 11 and the heat treatment zone 12 are each formed of a furnace in which the periphery of a conveying path of the glass ribbon G is surrounded by a wall portion, and each have a heating device for controlling the temperature of the glass ribbon G, such as a heater, arranged at an appropriate position of the furnace. Meanwhile, the cooling zone 13 is open to an ambient atmosphere at normal temperature without having the periphery of the conveying path of the glass ribbon G surrounded by a wall portion, and does not have a heating device such as a heater arranged therein. The glass ribbon G is subjected to a desired thermal history by passing through the heat treatment zone 12 and the cooling zone 13.

A forming trough 15 for forming the glass ribbon G from a first molten glass Gm1 by an overflow down-draw method is arranged in an internal space of the forming zone 11. Herein, the "first molten glass Gm1" means molten glass for forming the glass ribbon G serving as a product. The first molten glass Gm1 supplied to the forming trough 15 is overflowed form a groove portion (not shown) formed in a top portion 15a of the forming trough 15. The overflowed first molten glass Gm1 flows along both side surfaces 15b having a wedge-shaped cross-section of the forming trough 15 to be joined together (fusion integration) at a lower end 15c, to thereby continuously form the glass ribbon G having a sheet shape. The formed glass ribbon G is in a vertical posture (preferably a perpendicular posture). The glass ribbon G and the glass sheet Gp each have substantially the same glass composition as the first molten glass Gm1. Along with the joining (fusion integration), a joined surface is formed in an inside (e.g., a center portion in a thickness direction) of each of the glass ribbon G and the glass sheet Gp.

The forming trough 15 comprises an yttrium-containing oxide (e.g., $Y_3Al_5O_{12}$, which is a composite oxide of yttrium and aluminum) in order to ensure its mechanical strength. In this embodiment, the forming trough 15 is an alumina-based forming trough comprising an yttrium-containing oxide. The alumina-based forming trough comprising an yttrium-containing oxide preferably has a content of alumina of from 90 mass % to 98 mass % and a content of the yttrium-containing oxide of from 2 mass % to 10 mass %. The forming trough 15 may be a zircon-based forming trough or the like. However, in the case of the zircon-based forming trough, when the first molten glass Gm1 having a specific tempered glass composition is caused to flow down therealong, there is a risk in that zirconia derived from the forming trough 15 may be mixed in the first molten glass Gm1, and cause a defect in the glass ribbon G and/or the glass sheet Gp. Accordingly, from the viewpoint of preventing the generation of such defect resulting from zirconia, it is more preferred that the forming trough 15 be the alumina-based forming trough.

An internal space of the heat treatment zone 12 has a predetermined temperature gradient toward the lower side. The glass ribbon G in a vertical posture is subjected to heat treatment (annealing) so that its temperature is lowered as moving downward through the internal space of the heat treatment zone 12. Through the heat treatment, internal strain of the glass ribbon G is reduced. The temperature gradient of the internal space of the heat treatment zone 12 may be adjusted by, for example, a heating device arranged on an inner surface of the wall portion of the heat treatment zone 12.

The plurality of roller pairs 14 are configured to sandwich both edge portions of the glass ribbon G in a vertical posture in a width direction from both front and rear sides. Of the plurality of roller pairs 14, the roller pair arranged on the top stage is formed of cooling rollers 14a each comprising a cooling mechanism in an inside thereof. In the internal space of the heat treatment zone 12 or the like, the plurality of roller pairs 14 may comprise roller pairs that do not sandwich both the edge portions of the glass ribbon G in the width direction. In other words, an opposing interval of the roller pairs 14 may be set larger than thicknesses of both the edge portions of the glass ribbon G in the width direction so that the glass ribbon G passes between the roller pairs 14.

In this embodiment, both the edge portions of the glass ribbon G obtained by the treatment device 1 in the width direction comprise portions each having a larger thickness than a center portion in the width direction (hereinafter also referred to as "selvage portions") due to an influence of shrinkage in the course of forming or the like.

The cutting device 2 comprises a scribe line forming device 21 and a splitting device 22, and is configured to cut the glass ribbon G in a vertical posture, which moves downward from the treatment device 1, along the width direction every predetermined length. With this configuration, the glass sheets Gp are successively cut out of the glass ribbon G.

The glass sheet Gp is a glass original sheet (mother glass sheet) from which one or a plurality of product glass sheets are collected. The glass sheet Gp has a thickness of, for example, from 0.2 mm to 10 mm, and has a size of, for example, 700 mm×700 mm to 3,000 mm×3,000 mm. The glass sheet Gp is utilized as, for example, a substrate or a cover glass for a display. The substrate or the cover glass for a display is not limited to a flat panel.

The scribe line forming device 21 is a device for forming a scribe line S on one of front and rear surfaces of the glass ribbon G at a scribe line forming position P1 provided below the treatment device 1. In this embodiment, the scribe line forming device 21 comprises: a wheel cutter 23 for forming the scribe line S on one of the front and rear surfaces of the glass ribbon G along the width direction thereof; and a support member 24 (e.g., a support bar or a support roller) for supporting the other one of the front and rear surfaces of the glass ribbon G at a position corresponding to the wheel cutter 23.

The wheel cutter 23 and the support member 24 are each configured to form the scribe line S on the entire region or a part of the glass ribbon G in the width direction while being lowered so as to follow the glass ribbon G moving downward. In this embodiment, the scribe line S is formed also on both edge portions in the width direction comprising selvage portions each having a relatively large thickness. The scribe line S may be formed by laser irradiation or the like.

The splitting device 22 is a device for splitting the glass ribbon G along the scribe line S at a splitting position P2 provided below the scribe line forming position P1 to provide the glass sheet Gp. In this embodiment, the splitting device 22 comprises: a splitting member 25 to be brought into abutment against a formation region of the scribe line S from a surface side on which the scribe line S is not formed; and a chuck 26 for holding a lower region of the glass ribbon G below the splitting position P2.

The splitting member 25 is formed of a plate-like body (surface plate) having a flat surface to be held in contact with the entire region or a part of the glass ribbon G in the width direction while being lowered so as to follow the glass ribbon G moving downward. A contact surface of the splitting member 25 may be a curved surface that is curved in the width direction.

A plurality of chucks 26 are arranged in each of both the edge portions of the glass ribbon G in the width direction at intervals in the longitudinal direction of the glass ribbon G. The plurality of chucks 26 arranged in each of the edge portions in the width direction are all held by the same arm (not shown). Through an operation of the respective arms, the plurality of chucks 26 perform an operation for curving the glass ribbon G with the splitting member 25 being a fulcrum while being lowered so as to follow the glass ribbon G moving downward. With this configuration, a bending stress is applied to the scribe line S and the vicinity thereof to split the glass ribbon G in the width direction along the scribe line S. As a result, the glass sheet Gp is cut out from the glass ribbon G. The glass sheet Gp having been cut out is delivered from the chuck 26 to another chuck 28 of a conveying device 27, and is then conveyed in the state of the vertical posture along the width direction thereof (horizontal direction along the surface of the glass sheet Gp). A conveying direction of the glass sheet Gp by the conveying device 27 is not limited to the width direction, and may be set to an arbitrary direction. The chucks 26 and 28 may each be changed to another holding form based on negative-pressure suction or the like.

The inspection device 3 is a device for inspecting the presence or absence of a defect. The defect includes, for example, a devitrified product derived from the yttrium-containing oxide. For example, the inspection device 3 may be configured to measure thickness unevenness (thickness) in the glass sheet Gp, a stria (cord), and the kind (e.g., bubbles, foreign matter, or the like), position (coordinates), size, and the like of a defect, in addition to the devitrified product derived from the yttrium-containing oxide.

An inspection target of the inspection device 3 is the glass sheet Gp having been cut out of the glass ribbon G. In this embodiment, the inspection device 3 comprises: a light source 31 arranged at a predetermined position on one surface side of the front and rear surfaces of the glass sheet Gp; and a sensor 32 arranged at a predetermined position on the other surface side of the front and rear surfaces of the glass sheet Gp. The light source 31 radiates light toward the glass sheet Gp, and the sensor 32 receives the light having been radiated from the light source 31 and transmitted through the glass sheet Gp. The inspection device 3 detects the presence or absence of a defect based on a change in light amount received by the sensor 32.

The light source 31 and the sensor 32 of the inspection device 3 have an inspectable area linearly extending in the Z direction. As an inspection area with the light source 31 and the sensor 32, the front and rear surfaces of the glass sheet Gp are each scanned in its entirety by moving the glass sheet Gp by the conveying device 27. With this configuration, the presence or absence of a defect in the glass sheet Gp is inspected.

In this embodiment, the first molten glass Gm1 (glass ribbon G) is aluminosilicate glass comprising MgO (magnesium oxide) and $P_2O_5$ (phosphorus oxide). Specifically, the first molten glass Gm1 preferably comprises as a glass composition, in terms of mass %, 40% to 80% (more preferably 50% to 80%) of $SiO_2$, 5% to 30% (more preferably 5% to 25%) of $Al_2O_3$, 0% to 15% of $B_2O_3$, 1% to 25% (more preferably 1% to 20%) of $Na_2O$, 0% to 10% of $K_2O$, 0.3% to 5.5% of MgO, 0.5% to 10% of $P_2O_5$, and 0% to 10% of $Li_2O$. When the ranges of the glass composition are restricted as described above, the glass ribbon G easily achieves both ion exchange performance and devitrification resistance at high levels. Accordingly, the glass ribbon G suitable as a glass sheet to be chemically tempered to be used as a cover glass for a cellular phone, a digital camera, a personal digital assistant (PDA), a touch panel display, or the like is obtained.

MgO is a component that reduces a viscosity at high temperature to improve meltability and formability, and increases a strain point and a Young's modulus. Among alkaline earth metal oxides, MgO is a component that has a high effect of improving the ion exchange performance. However, when the content of MgO is too large, a density and a thermal expansion coefficient are liable to be increased, and the glass is liable to be devitrified. Accordingly, a suitable upper limit of the content range of MgO is 5.5% or less or 5% or less, particularly 4% or less. When MgO is introduced into the glass composition, a suitable lower limit of the content range of MgO is 0.3% or more, 0.5% or more, or 1% or more, particularly 2% or more.

$P_2O_5$ is a component that improves the ion exchange performance, and is particularly a component that increases the depth of layer of a compressive stress layer when the glass is chemically tempered. In addition, as the content of $P_2O_5$ becomes larger, the glass is more liable to undergo phase separation. A lower limit value of the content of $P_2O_5$ is preferably 0.5% or more, more preferably 2% or more, still more preferably 4% or more. Meanwhile, an upper limit value of the content of $P_2O_5$ is preferably 10% or less, more preferably 9% or less, still more preferably 8.5% or less.

$Li_2O$ is an ion exchange component, and is also a component that reduces the viscosity at high temperature to improve the meltability and the formability. In addition, $Li_2O$ is a component that increases the Young's modulus. Further, among alkali metal oxides, $Li_2O$ has a high effect of increasing a compressive stress value. However, when the content of $Li_2O$ is too large, a liquidus viscosity is reduced, and the glass is liable to be devitrified. In addition, the thermal expansion coefficient is excessively increased, with the result that thermal shock resistance is reduced, or it becomes difficult for the thermal expansion coefficient to match those of peripheral materials. Further, a viscosity at low temperature is excessively reduced, and stress relaxation is liable to occur, with the result that the compressive stress value may be reduced contrarily. Accordingly, a suitable lower limit of the content range of $Li_2O$ is, in terms of mass %, 0% or more, 0.1% or more, 0.5% or more, 1.0% or more, 1.5% or more, or 2.0% or more, particularly 2.5% or more, and a suitable upper limit of the content range thereof is 10% or less, 8% or less, 5% or less, 4.5% or less, or 4.0% or less, particularly less than 3.5%.

Figure 2:
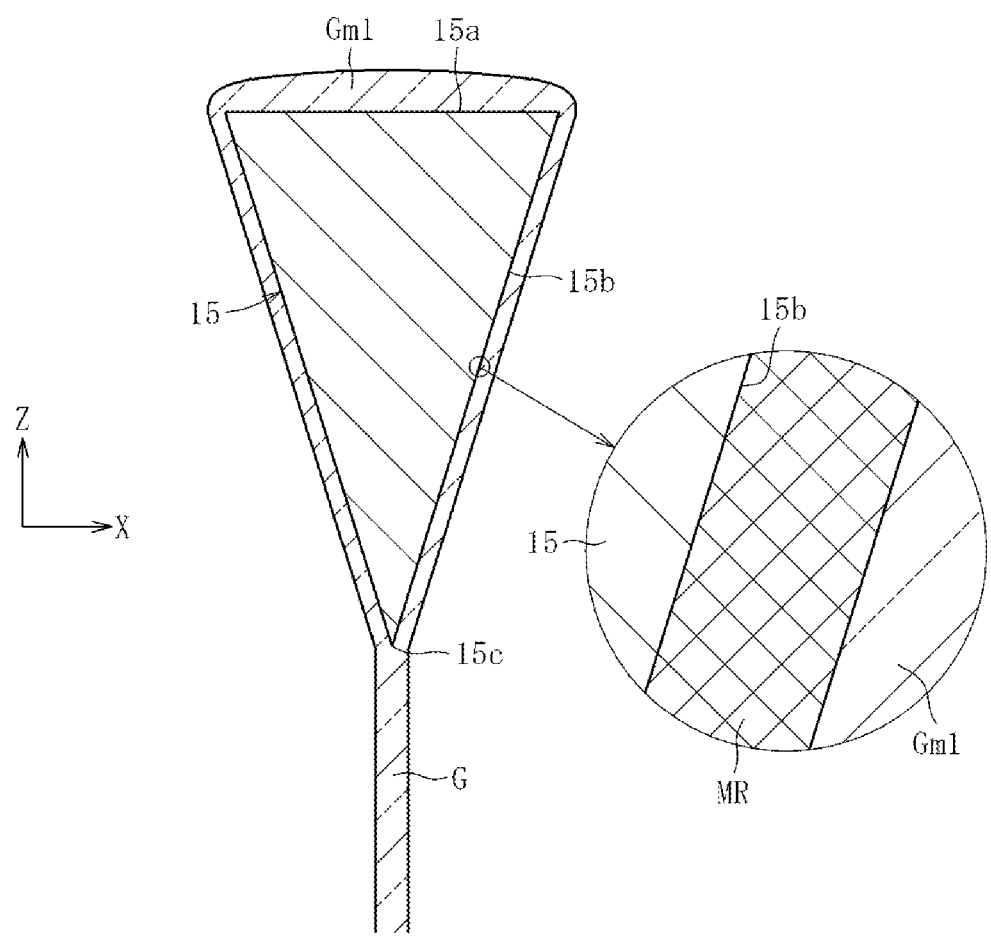
FIG. 2 is a vertical sectional view for illustrating the vicinity of a forming trough of the manufacturing apparatus for a glass article according to the first embodiment of the present invention in an enlarged manner.

As illustrated in FIG. 2, the forming trough 15 comprises a Mg-rich layer MR comprising magnesium on a surface thereof (e.g., a top 15a and a side surface 15b). The Mg-rich layer MR functions as a diffusion suppression layer for suppressing the diffusion of the yttrium-containing oxide included in the forming trough 15. The diffusion suppression layer is not limited to the Mg-rich layer MR, and any layer capable of suppressing the diffusion of the yttrium-containing oxide included in the forming trough 15 may be adopted.

The Mg-rich layer MR means a layer having a high concentration of magnesium. The content of magnesium in the Mg-rich layer MR is, for example, preferably 1 mass % or more.

The Mg-rich layer MR preferably comprises spinel ($MgAl_2O_4$) as a main component. When the forming trough 15 is the alumina-based forming trough as in this embodiment, the forming trough 15 comprises alumina, and hence the Mg-rich layer MR comprising spinel is easily formed on the surface of the forming trough 15. When the Mg-rich layer MR comprises spinel as a main component as described above, an upper limit of the content of Mg in the Mg-rich layer MR is 17 mass %. Accordingly, whether or not the Mg-rich layer MR comprises spinel as a main component, the content of Mg in the Mg-rich layer MR is preferably set to 17 mass % or less.

The Mg-rich layer MR has a thickness of preferably 100 μm or less, more preferably from 20 μm to 100 μm, most preferably from 50 μm to 100 μm.

Next, a method of manufacturing a glass article according to the first embodiment is described. This manufacturing method is a method of manufacturing the glass sheet Gp serving as a glass article by using the above-mentioned manufacturing apparatus.

As illustrated in FIG. 1, this manufacturing method comprises: a forming step; a heat treatment step; a cooling step; a cutting step; and an inspection step.

The forming step is a step of forming the glass ribbon G in the forming zone 11.

The heat treatment step is a step of subjecting the glass ribbon G having been subjected to the forming step to heat treatment in the heat treatment zone 12.

The cooling step is a step of cooling the glass ribbon G having been subjected to the heat treatment step in the cooling zone 13.

The cutting step is a step of, while conveying the glass ribbon G having been subjected to the cooling step, cutting the glass ribbon G in the width direction by the cutting device 2 to obtain the glass sheet Gp.

The inspection step is a step of inspecting the presence or absence of a defect (including a devitrified product derived from the yttrium-containing oxide) in the glass sheet Gp by the inspection device 3 or the like.

As illustrated in FIG. 2, in the forming step, the glass ribbon G is continuously formed by causing the first molten glass Gm1 to flow down along the surface of the forming trough 15 comprising an yttrium-containing oxide.

The forming trough 15 has formed on the surface thereof the Mg-rich layer MR serving as the diffusion suppression layer for suppressing the diffusion of the yttrium-containing oxide included in the forming trough 15. That is, in the forming step, the diffusion of the yttrium-containing oxide included in the forming trough 15 into the first molten glass Gm1 can be reliably suppressed with the Mg-rich layer MR. As a result, a reaction between yttrium oxide having diffused from the yttrium-containing oxide included in the forming trough 15 into the first molten glass Gm1 and $P_2O_5$ included in the first molten glass Gm1 is less liable to occur, with the result that the generation of a devitrified product derived from the yttrium-containing oxide (e.g., $Y_2O_3$-$P_2O_5$ crystal) can be reliably reduced.

In this embodiment, as described above, the first molten glass Gm1 comprises 0.3 mass % or more of MgO, and hence the diffusion of a magnesium ion from the Mg-rich layer MR into the first molten glass Gm1 can be suppressed. That is, the reduction, elimination, or alternation of the Mg-rich layer MR due to the diffusion of the magnesium ion can be suppressed. Accordingly, the Mg-rich layer MR can be stably maintained on the surface of the forming trough 15. When the first molten glass Gm1 is substantially free of MgO, the reduction or the like of the Mg-rich layer MR is liable to occur. However, until the Mg-rich layer MR is eliminated, the diffusion of the yttrium-containing oxide included in the forming trough 15 into the first molten glass Gm1 can be suppressed with the Mg-rich layer MR. That is, the Mg-rich layer MR can be applied as the diffusion suppression layer even when the first molten glass Gm1 is substantially free of MgO.

Figure 3:
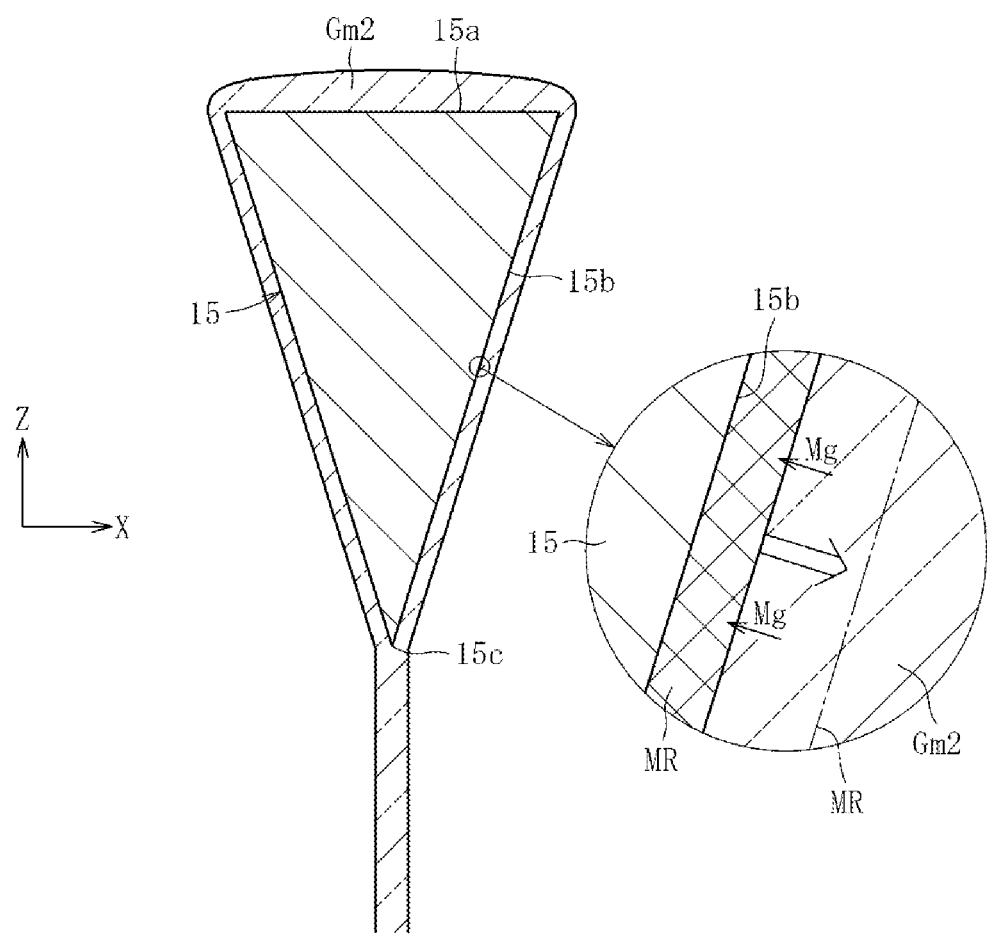
FIG. 3 is a vertical sectional view for illustrating a step of forming a diffusion suppression layer to be formed on the surface of the forming trough of FIG. 2.

As illustrated in FIG. 3, this manufacturing method further comprises, as a preliminary step to the forming step, a formation step of forming the Mg-rich layer MR.

In the formation step, the Mg-rich layer MR is formed by causing a second molten glass Gm2 comprising MgO to flow down along the surface of the forming trough 15.

Specifically, when the second molten glass Gm2 comprising MgO is caused to flow down along the surface of the forming trough 15, a magnesium ion diffuses from the second molten glass Gm2 into the forming trough 15 to form the Mg-rich layer MR on the surface of the forming trough 15. After that, when a magnesium ion continuously diffuses from the second molten glass Gm2 into the forming trough 15, the thickness of the Mg-rich layer MR is increased up to a predetermined thickness. With this configuration, the Mg-rich layer MR is sufficiently formed on the surface of the forming trough 15. In this course, the yttrium-containing oxide in the surface of the forming trough 15 diffuses into the second molten glass Gm2, and the content of the yttrium-containing oxide in the Mg-rich layer MR is reduced to become, for example, 0 mass % or more and 0.1 mass % or less.

In this embodiment, the forming trough 15 is the alumina-based forming trough, and hence in the above-mentioned formation step, alumina of the forming trough 15 and MgO of the second molten glass Gm2 react with each other to form the Mg-rich layer MR comprising spinel ($MgAl_2O_4$) as a main component.

The second molten glass Gm2 for forming the Mg-rich layer MR preferably has an identical or similar glass composition to the first molten glass Gm1 to be used for forming the glass ribbon G serving as a product. Alternatively, the second molten glass Gm2 is preferably glass substantially free of $P_2O_5$ (e.g., glass having a content of $P_2O_5$ of less than 0.1 mass %), and is, for example, preferably alkali-free glass substantially free of $P_2O_5$ and comprising MgO. In this case, even when the glass ribbon is formed while the second molten glass Gm2 is caused to flow down along the surface of the forming trough 15 in the formation step, a devitrified product derived from the yttrium-containing oxide is not generated in the glass ribbon to be obtained. Accordingly, a glass substrate for a display can be stably collected from the glass ribbon to be obtained.

From the viewpoint of promoting the formation of the Mg-rich layer MR, the content of MgO in the second molten glass Gm2 is preferably 1 mass % or more, more preferably 2 mass % or more. When the first molten glass Gm1 and the second molten glass Gm2 have different glass compositions, a base changing step of gradually changing molten glass to be supplied to the forming trough 15 from the second molten glass Gm2 to the first molten glass Gm1 is performed after the Mg-rich layer MR is formed. The forming step starts after the completion of the base changing step.

A method of forming the Mg-rich layer MR is not limited thereto. For example, the Mg-rich layer MR may be formed by sputtering film formation.

Second Embodiment

Next, a method of manufacturing a glass article according to a second embodiment is described. The manufacturing method of the second embodiment is a method of manufacturing the glass sheet Gp serving as a glass article by using the above-mentioned manufacturing apparatus of the first embodiment, but differs therefrom in that a magnesium ion diffuses from the Mg-rich layer MR into the first molten glass Gm1.

The first molten glass Gm1 of this embodiment is preferably aluminosilicate glass having a content of MgO of 0 mass % or more and less than 0.3 mass % and comprising $P_2O_5$. Specifically, the first molten glass Gm1 preferably comprises as a glass composition, in terms of mass %, 40% to 80% (more preferably 50% to 80%) of $SiO_2$, 5% to 30% (more preferably 5% to 25%) of $Al_2O_3$, 0% to 15% of $B_2O_3$, 1% to 25% (more preferably 1% to 25%) of $Na_2O$, 0% to 10% of $K_2O$, 0% or more and less than 0.3% of MgO, 0.5% to 10% of $P_2O_5$, and 0% to 10% of $Li_2O$.

That is, when the first molten glass Gm1 is free of MgO or has a small content of MgO, a magnesium ion diffuses from the Mg-rich layer MR into the first molten glass Gm1.

Figure 4:
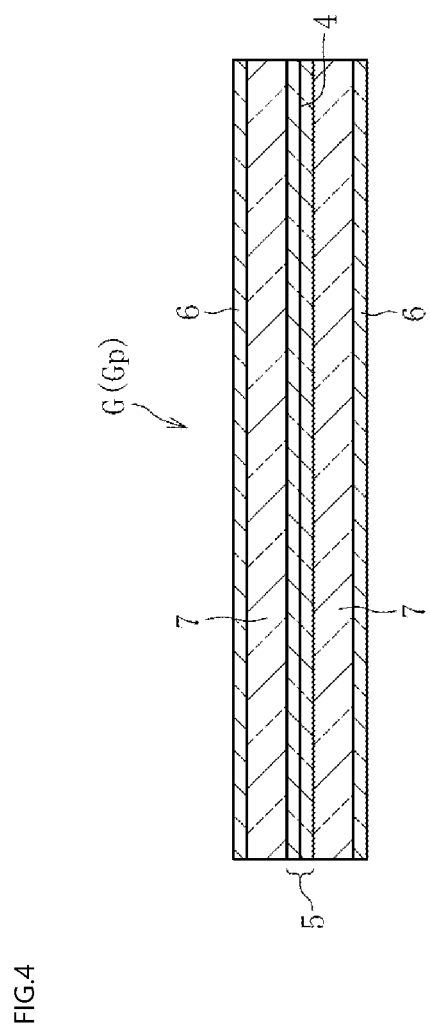
FIG. 4 is a sectional view of a glass ribbon and a glass sheet manufactured by a method of manufacturing a glass article according to a second embodiment of the present invention.

Along with this, in the strip-shaped first molten glass Gm1 flowing down along the side surface 15b of the forming trough 15, a portion of the first molten glass Gm1 brought into contact with the side surface 15b (Mg-rich layer MR) of the forming trough 15 is enriched in MgO (concentrated in MgO). Accordingly, as illustrated in FIG. 4, a MgO-rich layer 5 is formed at the position of a joined surface 4 of the glass article to be obtained (e.g., each of the glass ribbon G and the glass sheet Gp). MgO is a component that increases mechanical strength, and hence the MgO-rich layer 5 present in each of the glass ribbon G and the glass sheet Gp acts as a core material, with the result that warpage or deflection of each of the glass ribbon G and the glass sheet Gp can be reduced. In addition, along with concentration in MgO, the thermal expansion coefficient of the MgO-rich layer 5 is increased, and hence a compressive stress is generated in the surface layer of the glass ribbon G in the course of cooling the glass ribbon G having been formed. Accordingly, a surface layer 6 of each of the glass ribbon G and the glass sheet Gp becomes a compressive stress layer, and hence the glass article is suitable as glass to be chemically tempered.

Such MgO-rich layer 5 has a thickness of, for example, from 10 μm to 50 μm. From the viewpoint of further reducing the warpage or deflection, a ratio (R1/R2) of a content R1 of MgO in the MgO-rich layer 5 to a content R2 of MgO in an intermediate layer 7 between the surface layer 6 of each of the glass ribbon G and the glass sheet Gp and the MgO-rich layer 5 is preferably from 102.5% to 115%. Herein, the content R1 of MgO in the MgO-rich layer 5 is defined as the content R1 of MgO on the joined surface 4, and is measured by EPMA. The content R2 of MgO in the intermediate layer 7 between the surface layer 6 of each of the glass ribbon G and the glass sheet Gp and the MgO-rich layer 5 is defined as the content R2 of MgO at a middle position of the intermediate layer 7 in the thickness direction, and is measured by EPMA. The intermediate layer 7 of each of the glass ribbon G and the glass sheet Gp means a steady portion having a constant composition. The surface layer 6 of each of the glass ribbon G and the glass sheet Gp means a non-steady portion positioned on the surface layer, for example, a portion from the surface to a depth of from 10 μm to 200 μm, and corresponds to a chemically tempered layer or the like.

Third Embodiment

Figure 5:
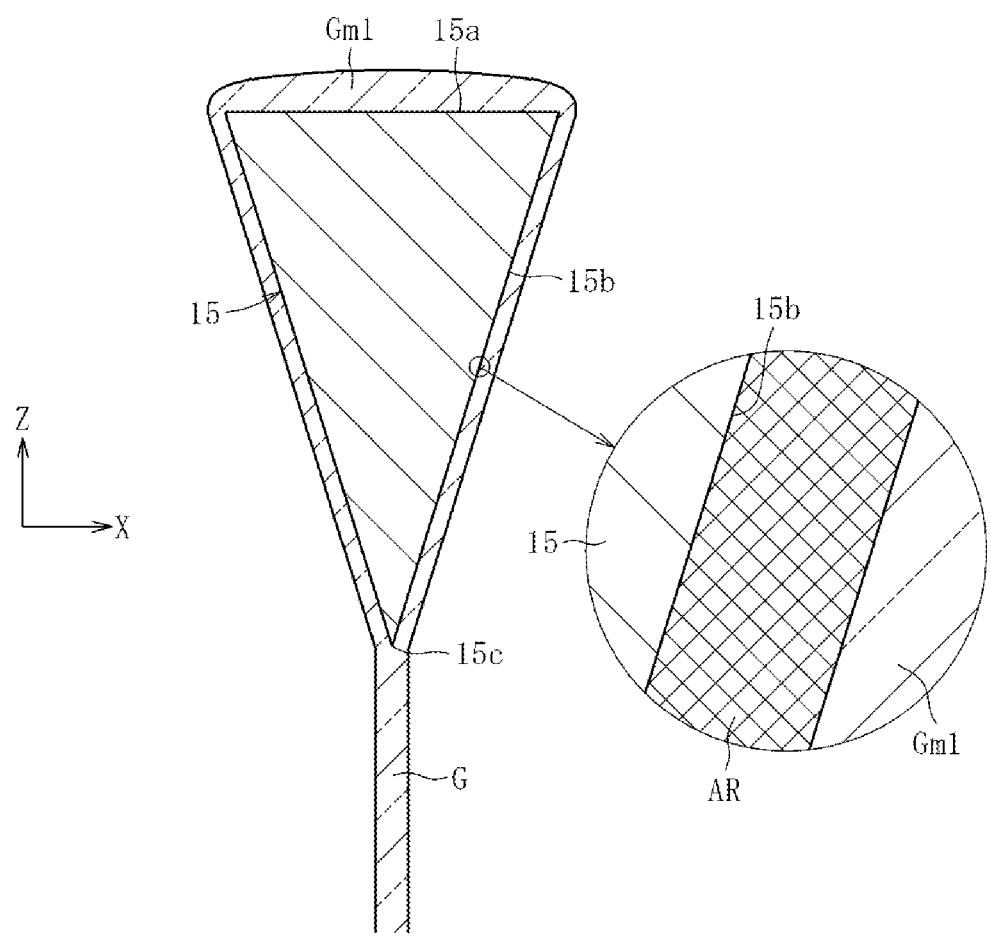
FIG. 5 is a vertical sectional view for illustrating the vicinity of a forming trough of a manufacturing apparatus for a glass article according to a third embodiment of the present invention in an enlarged manner.

As illustrated in FIG. 5, in the third embodiment, a case in which an alumina layer AR is formed on the surface (e.g., the top 15a and the side surface 15b) of the forming trough 15 as the diffusion suppression layer for suppressing the diffusion of the yttrium-containing oxide included in the forming trough 15 is taken as an example.

The alumina layer AR has a thickness of preferably 100 μm or less, more preferably from 20 μm to 100 μm, most preferably from 50 μm to 100 μm. The alumina layer AR may be changed in content (or purity) of alumina in a thickness direction thereof. In this case, the content (or purity) of alumina on a side to be brought into contact with the first molten glass Gm1 is preferably higher than the content (or purity) of alumina on a side to be brought into contact with the surface of the forming trough 15.

When the alumina layer AR is formed on the surface of the forming trough 15, in the forming step, the diffusion of the yttrium-containing oxide included in the forming trough 15 into the first molten glass Gm1 can be reliably suppressed with the alumina layer AR. As a result, a reaction between yttrium oxide having diffused from the yttrium-containing oxide included in the forming trough 15 into the first molten glass Gm1 and $P_2O_5$ included in the first molten glass Gm1 is less liable to occur, with the result that the generation of a devitrified product derived from the yttrium-containing oxide can be reliably reduced.

The method of manufacturing a glass article according to this embodiment further comprises, as a preliminary step to the forming step, a formation step of forming the alumina layer AR on the surface of the forming trough 15.

Figure 6:
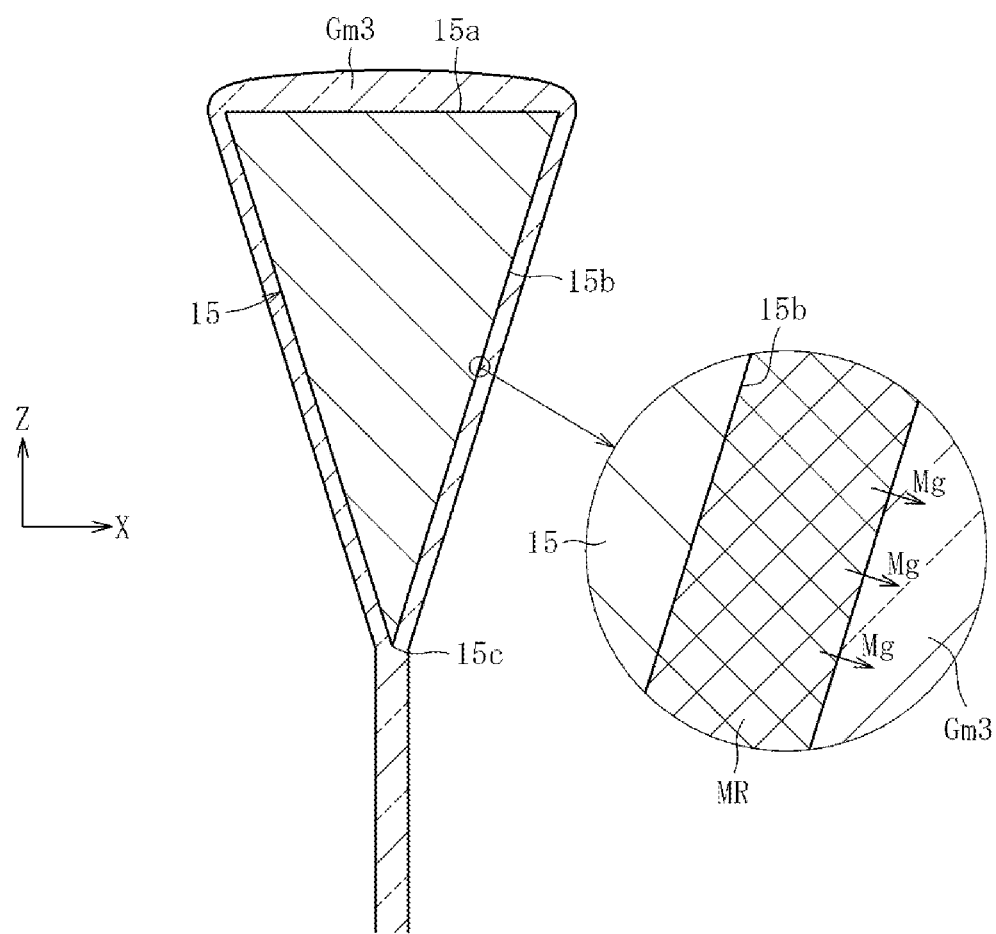
FIG. 6 is a vertical sectional view for illustrating a step of forming a diffusion suppression layer to be formed on the surface of the forming trough of FIG. 5.

As described in the first embodiment, the formation step comprises: a first step of causing a second molten glass Gm2 comprising MgO to flow down along the surface of the forming trough 15 to form a Mg-rich layer MR comprising spinel as a main component on the surface of the forming trough 15 (see FIG. 3); and a second step of causing a third molten glass Gm3 substantially free of MgO to flow down along the surface of the forming trough 15 on which the Mg-rich layer MR has been formed to form the alumina layer AR from the Mg-rich layer MR (see FIG. 6).

As illustrated in FIG. 6, in the second step, the third molten glass Gm3 substantially free of MgO (having a content of MgO of, for example, 0 mass % or more and less than 0.3 mass %) is caused to flow down along the surface of the forming trough 15 on which the Mg-rich layer MR has been formed, and thus a magnesium ion diffuses from the Mg-rich layer MR comprising spinel as a main component into the third molten glass Gm3, and magnesium included in the Mg-rich layer MR is eliminated. As a result, the Mg-rich layer MR comprising spinel as a main component formed on the surface of the forming trough 15 turns into the alumina layer AR. With this configuration, the alumina layer AR is formed on the surface of the forming trough 15. As described above, the content of the yttrium-containing oxide in the Mg-rich layer MR is reduced, and hence the content of alumina in the alumina layer AR is higher than the content of alumina in the alumina forming trough. That is, the alumina layer AR is formed of alumina at a high concentration.

When the diffusion suppression layer is the alumina layer AR, the first molten glass Gm1 is preferably aluminosilicate glass having a content of MgO of 0 mass % or more and less than 0.3 mass % and comprising $P_2O_5$. Specifically, the first molten glass Gm1 preferably comprises as a glass composition, in terms of mass %, 40% to 80% (more preferably 50% to 80%) of $SiO_2$, 5% to 30% (more preferably 5% to 25%) of $Al_2O_3$, 0% to 15% of $B_2O_3$, 1% to 25% (more preferably 1% to 25%) of $Na_2O$, 0% to 10% of $K_2O$, 0% or more and less than 0.3% of MgO, 0.5% to 10% of $P_2O_5$, and 0% to 10% of $Li_2O$.

That is, when the first molten glass Gm1 is free of MgO or has a small content of MgO, a magnesium ion does not diffuse from the first molten glass Gm1 into the alumina layer AR. Accordingly, the alumina layer AR can be stably maintained on the surface of the forming trough 15. When the first molten glass Gm1 comprises MgO to some extent, a magnesium ion diffuses from the first molten glass Gm1 into the alumina layer AR, and the alumina layer AR turns into the Mg-rich layer MR comprising spinel as a main component again. In other words, until the alumina layer AR turns into the Mg-rich layer MR, the diffusion of the yttrium-containing oxide included in the forming trough 15 into the first molten glass Gm1 can be suppressed with the alumina layer AR. That is, the alumina layer AR can be applied as the diffusion suppression layer even when the first molten glass Gm1 comprises MgO.

The third molten glass Gm3 for forming the alumina layer AR preferably has an identical or similar glass composition to the first molten glass Gm1 to be used for forming the glass ribbon G serving as a product. The third molten glass Gm3 may be glass substantially free of $P_2O_5$ (e.g., glass having a content of $P_2O_5$ of less than 0.1 mass %). When the first molten glass Gm1 and the third molten glass Gm3 have different glass compositions, a base changing step of gradually changing molten glass to be supplied to the forming trough 15 from the third molten glass Gm3 to the first molten glass Gm1 is performed after the alumina layer AR is formed. The forming step starts after the completion of the base changing step.

Herein, the temperature of at least one of the second molten glass Gm2 or the third molten glass Gm3 in the above-mentioned formation step for the alumina layer AR is preferably set to be higher than the temperature (operation temperature) of the first molten glass Gm1 in the forming step. With this configuration, yttrium oxide is easily eluted from the yttrium-containing oxide in a surface layer portion of the forming trough 15 into the second molten glass Gm2 and/or the third molten glass Gm3 at the stage of the formation step, and the concentration of the yttrium-containing oxide in the surface layer portion of the forming trough 15 can be reduced. As a result, the amount of the yttrium-containing oxide in the Mg-rich layer MR is reduced, and the alumina layer AR having a high concentration of alumina is easily formed from the Mg-rich layer MR.

Herein, it is experimentally proven that a time period for the yttrium-containing oxide in the surface layer portion of the forming trough 15 to substantially completely finish moving as yttrium oxide into the molten glass becomes remarkably shorter when the temperature of the molten glass is 1,250° C. or more than when the temperature of the molten glass is less than 1,250° C. Accordingly, a temperature at which the molten glass is retained at high temperature in the formation step is preferably 1,250° C. or more, and a retention time at the temperature is preferably 72 hours or more. However, when the temperature of the molten glass is excessively increased, creep may be generated in the forming trough 15, and hence the temperature at which the molten glass is maintained at high temperature in the formation step is preferably set to 1,300° C. or less.

A method of forming the alumina layer AR is not limited thereto.

The manufacturing apparatus for a glass article and the manufacturing method therefor according to the embodiments of the present invention have been described. However, the embodiments of the present invention are not limited thereto and may be variously modified within the range not departing from the spirit of the present invention.

While the glass ribbon G is cut by scribe cleaving in each of the above-mentioned embodiments, the glass ribbon G may be cut by another method, such as laser cleaving or laser melt-cutting.

A cutting step of cutting the selvage portion of the glass sheet Gp may be further provided prior to the inspection step using the inspection device 3 in each of the above-mentioned embodiments.

While the case in which the glass article is the glass sheet Gp has been described in each of the above-mentioned embodiments, the glass article may be, for example, a glass roll in which the glass ribbon G is taken up into a roll shape.

The method of manufacturing a glass article may further comprise a tempering step of chemically tempering the glass sheet Gp (glass sheet to be chemically tempered) in each of the above-mentioned embodiments.

While the case in which the first molten glass Gm1 is the aluminosilicate glass has been described in each of the above-mentioned embodiments, the first molten glass Gm1 is not limited thereto.

REFERENCE SIGNS LIST 1 treatment device
2 cutting device
3 inspection device
11 forming zone
12 heat treatment zone
13 cooling zone
14a roller pair (cooling roller)
15 forming trough
21 scribe line forming device
22 splitting device
23 wheel cutter
24 support member
25 splitting member
27 conveying device
G glass ribbon
Gm1 first molten glass
Gp glass sheet
MR Mg-rich layer
AR alumina layer

The invention claimed is:

1. A method of manufacturing a glass article, the method comprising a forming step of causing a first molten glass comprising $P_2O_5$ to flow down along a surface of a forming trough comprising an yttrium-containing oxide of from 2 mass % to 10 mass % by a down-draw method to form a glass ribbon,
wherein the forming trough comprises a diffusion suppression layer for suppressing diffusion of the yttrium-containing oxide on the surface thereof,
wherein the forming trough is an alumina-based forming trough and the diffusion suppression layer is an alumina layer, and
wherein a content of alumina in the alumina layer is higher than a content of alumina in the alumina-based forming trough.

2. The method of manufacturing a glass article according to claim 1, wherein the first molten glass has a content of MgO of 0 mass % or more and less than 0.3 mass %.

3. The method of manufacturing a glass article according to claim 1, wherein the first molten glass comprises as a glass composition, in terms of mass %, 40% to 80% of $SiO_2$, 5% to 30% of $Al_2O_3$, 0% to 15% of $B_2O_3$, 1% to 25% of $Na_2O$, 0% to 10% of $K_2O$, 0% or more and less than 0.3% of MgO, 0.5% to 10% of $P_2O_5$, and 0% to 10% of $Li_2O$.

4. The method of manufacturing a glass article according to claim 1, further comprising, as a preliminary step to the forming step, a formation step of forming the alumina layer on the surface of the forming trough,
wherein the formation step comprises:
a first step of causing a second molten glass comprising MgO to flow down along the surface of the forming trough to form a Mg-rich layer comprising spinel as a main component on the surface of the forming trough; and
a second step of causing a third molten glass substantially free of MgO to flow down along the surface of the forming trough on which the Mg-rich layer has been formed to form the alumina layer.

5. The method of manufacturing a glass article according to claim 4, wherein a temperature of at least one of the second molten glass or the third molten glass in the formation step is higher than a temperature of the first molten glass in the forming step.

6. A method of manufacturing a glass article, the method comprising:
a forming step of causing a first molten glass comprising $P_2O_5$ to flow down along a surface of a forming trough comprising an yttrium-containing oxide by a down-draw method to form a glass ribbon; and
a formation step, performed prior to the forming step, of forming a diffusion suppression layer on the surface of the forming trough to suppress diffusion of the yttrium-containing oxide,
wherein the diffusion suppression layer is an alumina layer, and
wherein the formation step comprises:
a first step of causing a second molten glass comprising MgO to flow down along the surface of the forming trough to form a Mg-rich layer comprising spinel as a main component on the surface of the forming trough; and
a second step of causing a third molten glass substantially free of MgO to flow down along the surface of the forming trough on which the Mg-rich layer has been formed to form the alumina layer.

7. The method of manufacturing a glass article according to claim 6, wherein a temperature of at least one of the second molten glass or the third molten glass in the formation step is higher than a temperature of the first molten glass in the forming step.

* * * * *